April 17, 1962 S. GAULEY 3,029,906

DECELERATION RESPONSIVE BRAKE

Filed Sept. 8, 1960

INVENTOR.
SHERMAN GAULEY
BY
*Frank C. Parker*
*D. E. Dougherty*
ATTORNEY & AGT

United States Patent Office 3,029,906
Patented Apr. 17, 1962

3,029,906
DECELERATION RESPONSIVE BRAKE
Sherman Gauley, Irondequoit, N.Y., assignor to Bausch & Lomb Incorporated, Rochester, N.Y., a corporation of New York
Filed Sept. 8, 1960, Ser. No. 54,667
3 Claims. (Cl. 188—136)

This invention relates to a deceleration responsive brake and more particularly to a brake having means for responding to predetermined rate of deceleration.

In accordance with this invention an object is to provide a deceleration responsive brake which is energized by a predetermined movement of the braking members in response to a pre-determined rate of deceleration.

A brake made according to this invention is inexpensive to manufacture, and facilitates rotational balance of the assembly. The brake applies a retarding force which is responsive to deceleration; and tends to eliminate adjustment of mechanical actuating parts.

The foregoing and such other objects of the invention as will appear hereinafter will be more readily understood from a detailed description in which.

Figure 1:
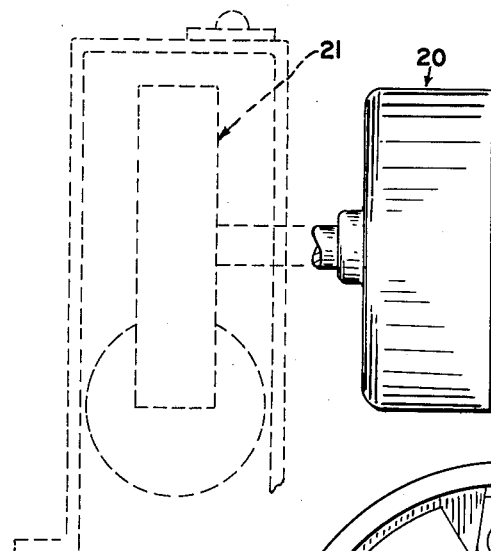
FIG. 1 shows a deceleration responsive brake mounted on a shaft of a motor.
Figure 2:
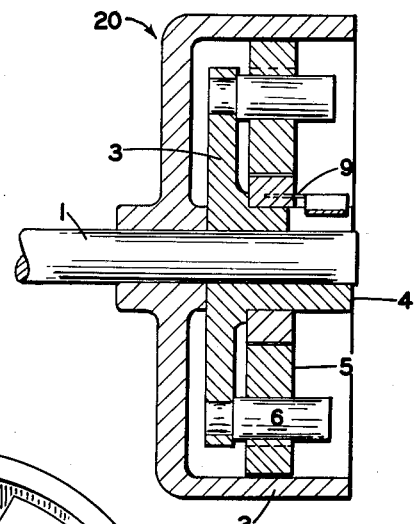
FIG. 2 is a cross-sectional view of a brake made in accordance with this invention.

Briefly, the mechanism disclosed herein comprises a rotatable member, a stationary member, and a third member resiliently connected to the rotatable member. A plurality of sprags are mounted on the rotatable member within sockets formed in the third member for frictionally engaging the rotatable member and the stationary member in response to the deceleration of the rotatable member in order to effect the braking action.

Referring now more particularly to the drawings, a deceleration responsive brake 20 is shown in conjunction with a motor 21. The invention comprises a rotatable shaft 1 and a stationary drum 2. Carried on the shaft 1 is a cross member 3 provided with a hub 4. The hub 4 of the cross member 3 is keyed to the shaft 1. The cross member 3 carries a pair of sprag members 5 pivotally mounted on a pair of projecting pins 6. The sprag members 5 are also pivotally mounted within sockets 7 in a weight member 8. The weight member 8 is connected to the hub 4 so as to be rotatable with shaft 1 through the intermediary of a leaf spring 9. The spring 9 may be fastened to the hub 4 by any suitable means such as the spring detent connection 9'.

Figure 5:
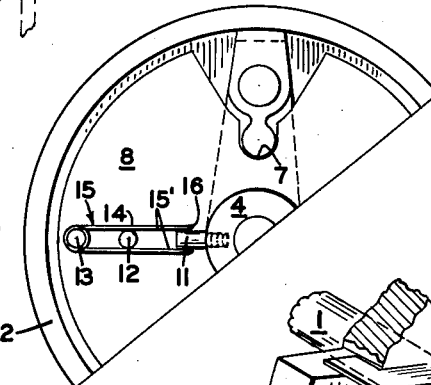
FIG. 5 is a fragmentary plan view of a modification of the brake assembly shown in FIG. 3.
Figure 4:
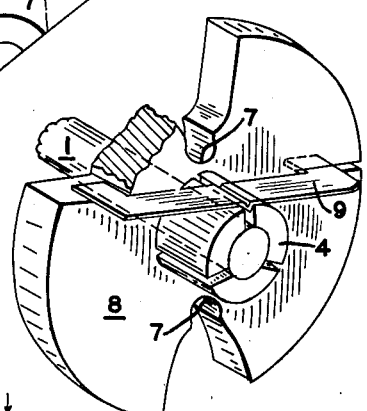
FIG. 4 is a perspective view showing the rotatable weight mounted on the shaft and showing the intermediate connecting spring keyed to the shaft.
Figure 3:
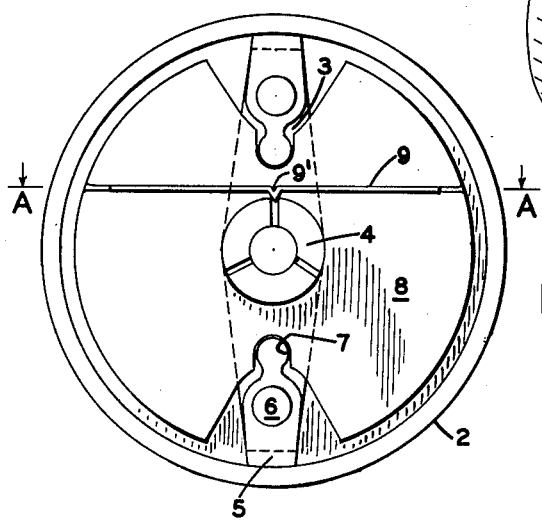
FIG. 3 is a plan view of the brake assembly.

A modified spring for connecting the weight 8 to the hub 4 is shown in FIG. 5. A stud 11 is secured to the hub 4 in a conventional manner, such as the hub 4 being bored and tapped to receive a threaded portion of stud 11. Stud 11 protrudes radially from the hub 4 substantially perpendicularly to shaft 1. Studs 12 and 13 are secured to the weight 8 along a radial line extending from hub 4.

A hairpin spring 15 is pivotally engaged with weight member 8 by being wrapped around the outer stud 13. Two spring arms 15' extend from stud 13 in substantially a hairpin arrangement inwardly toward hub 4. The stud 12, also mounted on the same radial axis as stud 13, retains spring arms 15' in a spaced relationship substantially parallel to each other. The outer ends 16 of spring 15 are slidably engaged with stud 11. The ends 16 of the spring 15 may be bent to engage stud 11.

The modified arrangement shown in FIG. 5 has been found to be more readily adapted to brake assemblies of a relatively small size, i.e. approximately one inch in diameter. The modified spring requires a finite force to move weight 8 with respect to hub 4 sufficiently to effect engagement of sprags 5 with the drum 2. Adjustment of spring tension may then be used to regulate the actuating force whereby the brake will not be responsive until a predetermined rate of deceleration is reached.

During operation of the brake mechanism, upon acceleration, assuming shaft 1 to be rotating in a counter clockwise direction, there will be a tendency for the weight 8 to lag behind, thereby pivoting the sprags 5 counterclockwise about the pivots 6. This tends to create a drag between the outer peripheries of sprags 5 and drum 2, which drag tends to return the sprags 5 to the position shown and to bring the weight 8 into the relative position shown in the drawing. Consequently, there is little or no braking effect exerted on the shaft 1 during acceleration of the shaft 1.

During deceleration of the shaft 1, assuming that it is rotating in a counter clockwise direction, there will be a tendency for the weight 8 to rotate counter clockwise faster than the shaft 1 and this will have the effect of pivoting the sprags 5 in a clockwise direction about the pivots 6. This will tend to bring the leading edges of the outer peripheries of the sprags into engagement with the inner periphery of the drum 2 and will have the effect of locking the sprags relative to the drum so as to exert braking action upon shaft 1.

It is contemplated that changes and modifications may be made in the present invention without departing from the spirit or scope thereof.

What is claimed is:

1. A deceleration responsive brake comprising a rotatable member, a stationary member, a third member resiliently interconnected to said rotatable member, and a plurality of engaging elements pivotally mounted on said rotatable member within sockets formed in said third member for frictionally engaging said rotatable member and said stationary member for braking the rotatable member and actuated by said third member in response to the deceleration of said rotatable member.

2. A deceleration responsive brake comprising a rotatable member, a stationary drum, a plurality of sprag members pivotally mounted on said rotatable member, a weight, a spring, said weight rotatable with the rotatable member through the intermediary of said spring, and said sprag members being pivotally mounted within sockets formed in said weight and being actuated by deceleration of the rotatable member, whereby said sprag members are brought into contact with the drum upon the deceleration of the rotatable member.

3. A deceleration responsive brake comprising a rotatable member, a stationary drum, a plurality of sprag members pivotally mounted on said rotatable member, a weight, a hairpin spring, said weight being rotatable with the rotatable member through the intermediary of said spring, and said sprag members being pivotally mounted within sockets formed in said weight and being actuated by deceleration of said rotatable member, whereby said sprag members are brought into contact with the drum upon the deceleration of said rotatable member.

References Cited in the file of this patent

UNITED STATES PATENTS

| | | |
|---|---|---|
| 2,042,280 | Stuart | May 26, 1936 |
| 2,068,370 | Bush | Jan. 19, 1937 |
| 2,631,696 | Yarber | Mar. 17, 1953 |
| 2,687,047 | O'Connor | Aug. 24, 1954 |

FOREIGN PATENTS

| | | |
|---|---|---|
| 611,991 | France | July 20, 1926 |